UNITED STATES PATENT OFFICE.

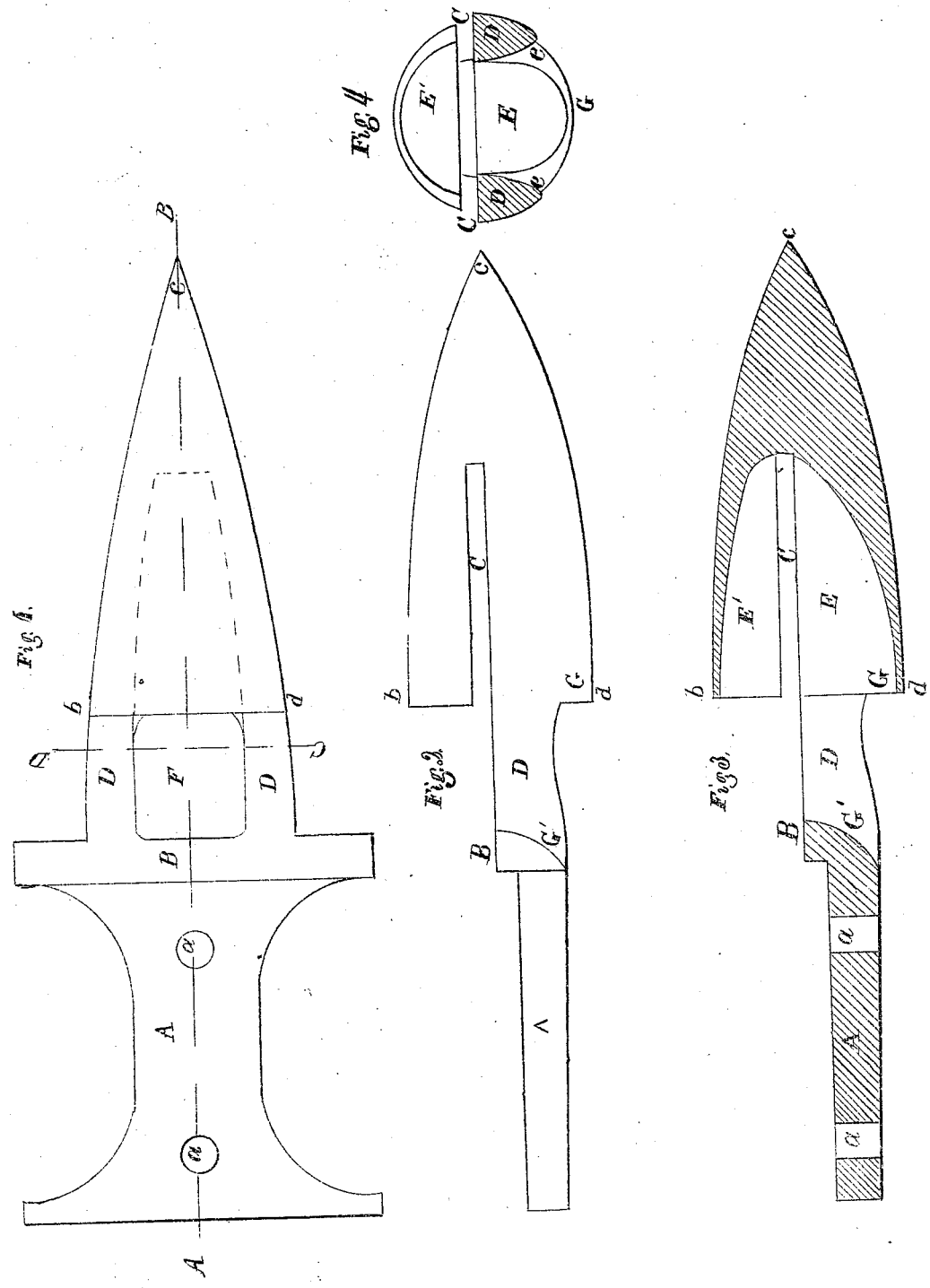

HENRY C. SMITH, OF CLEVELAND, OHIO.

IMPROVEMENT IN HARVESTER-FINGERS.

Specification forming part of Letters Patent No. 19,518, dated March 2, 1858.

*To all whom it may concern:*

Be it known that I, HENRY C. SMITH, of Cleveland, in the county of Cuyahoga and State of Ohio, have invented new and useful Improvements in Fingers or Guards for the Cutters of Harvesters; and I do hereby declare that the following is a full and complete description of the construction and operation of the same, reference being had to the accompanying drawings, and to letters of reference marked thereon, making part of this specification, in which—

Figure 1 is a plan view; Fig. 2, a side view; Fig. 3, a vertical section in the direction of the red line A B in Fig. 1, and Fig. 4 a cross-section in the direction of the red line C D.

A, Figs. 1, 2, and 3, shows the shank of the guard with the bolt-holes a a, by which it is secured to the cutter-bar. B shows the face of the guard upon which the knife-bar slides. C shows the slit or opening for the knife. D shows the bars at the two sides, which support the forward end of the guard. The external figure of the forward part of the guard is cylindrical and cone-shaped, as seen at b c d, the whole being formed of one piece of cast metal. The interior of the guard E E' is also cylindrical, the cavity being cone-like, the base of which terminates in the opening F between the bars D. By the peculiar form of the guard or finger the knife is protected both upon its upper and under sides from all liability to become clogged or choked up with grass or stubble, and in consequence of the cone-like interior what little grass or straw may be drawn in is constantly worked backward and discharged through the cavity F, between the bars D D, both above and below the knife. The size of the opening, both above and below the cutter-blade, is fully shown in Fig. 4 at E E'. Another superiority this guard has over others is in the additional strength given to it by the bars D D. In the usual form of construction there is but one bar, and that is in the middle of the guard, and would therefore obstruct the passage of the grass, straw, &c., from the cavity of the guard or tooth.

In my improved form of construction the clearing of the cavity below the knife is facilitated by the action of the stubble at the point G in Figs. 2, 3, and 4, operating in the manner of a brush as the guard passes along over the ground. The under side of the forward end of the shank is curved backward in the form of runner, so that the earth will not collect before it. This feature is shown at G'. The back end of the cone at G is lower than the shank G', thereby preventing the point G' from coming into contact with the ground unless the same is uneven.

By my peculiar form of construction (the cavity in the guard being cone-shaped) the constant tendency is for all the straw, stubble, &c., that is drawn in by the knife to work backward and drop out at the opening E and E', as seen in Fig. 4. The distance between the bars D D at the under edge being greater than at the top, as seen at e e, it is thereby rendered impossible for obstructions to remain within this space.

I am aware that guards for the cutters of harvesters have been made with cavities of various forms, or open both above and below; but for want of strength in some of their parts or from liability to clog they are subject to objections which I believe are obviated in my improvement, which forms a new article of manufacture, which can be applied to any harvester of the usual form of construction.

What I claim as my improvement in harvester guards or fingers, and for which I desire Letters Patent, is—

The bars D D, with the opening F, the cone b c d, with the cone-cavity E E', so formed in relation to the bars D D that the under side of the cone shall project below the said bars attached to the shank A. This I claim when constructed and arranged substantially as set forth, for the purpose described.

H. C. SMITH.

Witnesses:
I. BRAINERD,
W. H. BURRIDGE.